H. J. Alvord,
Commode,
№ 56,870.    Patented July 31, 1866.

Witnesses:
W. Morris Smith
Sydney E. Smith

Inventor:
H. J. Alvord

UNITED STATES PATENT OFFICE.

H. J. ALVORD, OF DETROIT, MICHIGAN.

IMPROVED DISINFECTING-COMMODE.

Specification forming part of Letters Patent No. 56,870, dated July 31, 1866.

*To all whom it may concern:*

Be it known that I, H. J. ALVORD, of Detroit, in Wayne county and State of Michigan, have invented a new and useful Improvement in Disinfecting-Commodes; and I do hereby declare that the following is a full, clear, and exact description thereof, reference being had to the accompanying drawings, and to letters of reference marked thereon, and in which—

Figure 1:
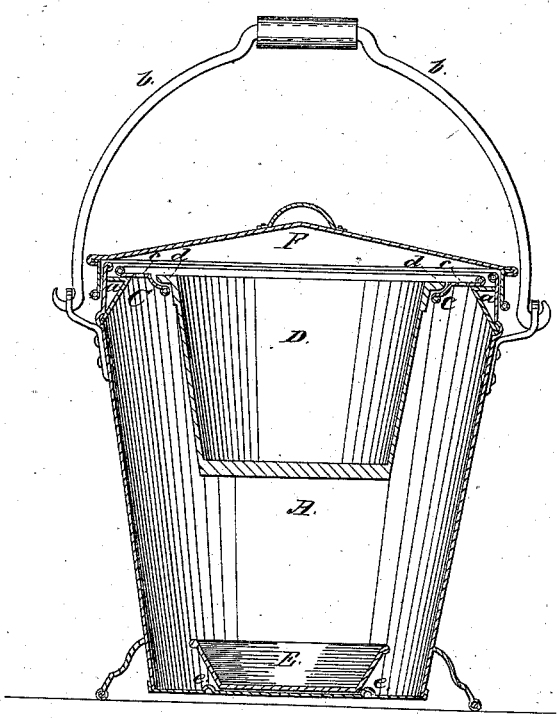
Figure 2:
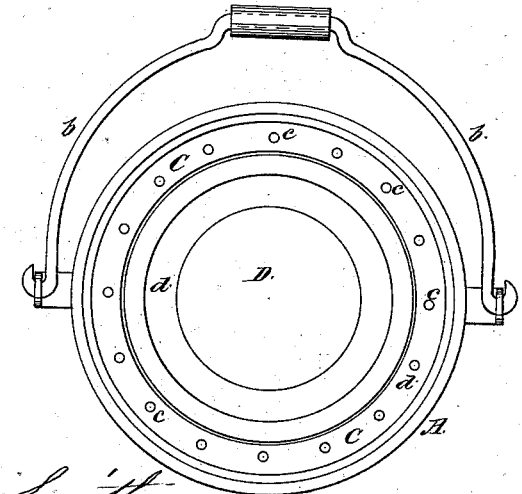

Figure 1 represents a central vertical section of my apparatus, and Fig. 2 a top view of the same with the cover removed.

Similar letters of reference in both figures indicate corresponding parts.

A portable and convenient disinfecting night-commode is a necessity in every family where the advantages of water-closets cannot be obtained; and to supply this requisite is the object of my invention, which consists in adapting to a pail or bucket of suitable size a pan or receptacle for the excrements and a vessel to contain any disinfecting agents, so arranged with regard to each other that the vapors from the disinfectant shall commingle with the other noxious fumes in such manner as to destroy their poisonous effect.

To enable others skilled in the art to understand and use my invention, I will proceed to describe it by reference to the drawings, in which—

A represents an ordinary bucket, made of tin, zinc, or other suitable material, which is provided near its upper edge with an internal ledge or flange, $a$, for supporting the pan D, and a bail, $b$, for the purpose of carrying it from place to place.

C is an annular collar or flange fitted to rest upon the ledge $a$, on the interior and near the upper edge of the bucket A, and is perforated with a series of holes, $c$, the object of which will be hereinafter more fully explained. The inner edge of this flange is curved downward and inward, so as to stiffen it, and at the same time to form a recess on its upper surface for the reception and support of the flange $d$ of the pan or receptacle D, which is inserted, and thereby supported, in the bucket A. The bottom of the bucket A is constructed with an annular ridge, $e$, or other suitable device for retaining a pan, E, in central position, the use of which will be more fully explained hereinafter. The bucket is further provided with a cover, F, which surmounts and incloses the whole.

A modification of my invention may be made as follows: A chest similar to the casing of a water-closet may be substituted for the bucket, provided with an inner perforated top having a central hole for the reception of the pan D, and a tight cover to inclose the top. In this case the pan D must be provided with a bail and cover for its removal without removing the casing.

The use and operation of this apparatus is as follows: The pan E is charged with chloride of lime, sulphate of iron, or any other disinfectant, the fumes from which arise in the annular space around the pan or receptacle D and escape through the apertures $c$ in the flange C, and, passing over within the cover F, commingle with the noxious fumes arising from the receptacle D, and deodorize them, thus preventing infection in cases of cholera and other diseases that are generated and diffused by the fumes of excrements of diseased persons. The whole apparatus can then be removed, and its contents deposited in a suitable receptacle, out of range of any probability of communicating the disease.

Having thus described my invention, what I claim as new, and desire to secure by Letters Patent, is—

The arrangement and combination of the pans D and E, perforated annular flange C, and cover F with the bucket or casing A, or their equivalents, substantially as and for the purposes described.

H. J. ALVORD.

Witnesses:
W. MORRIS SMITH,
SYDNEY E. SMITH.